United States Patent Office 3,192,175
Patented June 29, 1965

3,192,175
SEALANT COMPOSITION OF 3,3,3-TRIFLUORO-PROPYLMETHYLSILOXANE GUMS
James R. Russell, Midland, Mich., assignor to Dow Corning Corporation, Midland, Mich., a corporation of Michigan
No Drawing. Filed Sept. 27, 1962, Ser. No. 226,731
5 Claims. (Cl. 260—29.1)

This invention relates to a sealant composition. More particularly, this invention relates to a sealant for fuel tanks such as the integral fuel tanks found in the wings of jet aircraft.

Due to the practical impossibility of forming a leak-proof juncture by welding pieces of metal together for fuel tanks, there has been much research done in developing satisfactory fuel tank sealants. For many purposes organic sealants were satisfactory, but it was well known that the organic compounds failed where heat stability was necessary. This is particularly true in the wings of jet aircraft. For heat stability attention was focused on the silicone field. Of the various sealant compositions available prior to this invention none had a satisfactory combination of heat stability and solvent resistance, particularly when used as fuel tank sealants in the wings of jet aircraft. The compositions of this invention overcome the disadvantages of the sealants known prior to this time.

The sealant composition of this invention consists essentially of 100 parts by weight of a 3,3,3-trifluoropropylmethylsiloxane gum (a gum being a siloxane having a viscosity greater than 1,000,000 cs.), 5 to 50 parts by weight of a finely divided silica having a surface area of at least 100 square meters per gram, 75 to 300 parts by weight of a 3,3,3-trifluoropropylmethylsiloxane fluid having a viscosity from 2,000 to 150,000 cs. and 0.5 to 25 parts by weight of a polytetrafluoroethylene resin having an average particle size of less than one micron.

Both the trifluoropropylmethylsiloxane gum and fluid employed herein can contain small amounts, generally less than 10 mol percent, of other siloxane units such as dimethylsiloxane, phenylmethylsiloxane, bis-trifluoropropylsiloxane, diphenylsiloxane and phenylvinylsiloxane. Both the fluid and the gum can if desired be endblocked with triorganosilyl units such as trimethylsilyl, vinyldimethylsilyl, diphenylmethylsilyl and trifluoropropyldimethylsilyl units. These siloxanes in small amount do not change the essential character of the trifluoropropylmethylsiloxane.

It is essential that the ingredients be thoroughly mixed together. The mixing may be accomplished, for example, by the use of a two or three roll mill.

The proportions of the ingredients employed must be such that the resultant composition has a plasticity number of 125 to 380 as measured by the ASTM test D 926–56; the test specimens being prepared according to method (b); the test being carried out at room temperature; the duration of the load application on the test specimen being three minutes.

Conventional additives such as extending fillers, anticrepe aging agents, pigments, stabilizers and the like, may also be included in the composition.

Specific examples of extending fillers are relatively coarse silicas such as crushed quartz, diatomaceous earth and sand; metal oxides such as $TiO_2$, ferric oxide, zinc oxide and alumina; and silicates such as aluminum silicate, zirconium silicate and magnesium silicate. These extending fillers have surface areas less than 100 square meters per gram.

In the following examples all parts are by weight unless otherwise specified.

*Example 1*

A sealant composition having a plasticity number of 302 was prepared by mixing 100 parts of a gum having a viscosity greater than 1,000,000 cs. which consisted essentially of 99.5 mol percent of 3,3,3-trifluoropropylmethylsiloxane and 0.5 mol percent of vinylmethylsiloxane, 100 parts of a 3,3,3-trifluoropropylmethylsiloxane fluid having a viscosity of 50,000 cs., 30 parts of a finely divided silica having a surface area of about 225 square meters per gram, 5 parts of a polytetrafluoroethylene resin having a particle size of about 0.2 micron, 50 parts of a silica extending filler having a particle size of about 5 microns and 5 parts of hydroxylated phenylmethylsiloxane anticrepe aging agent having a viscosity of 100 cs.

*Example 2*

Another sealant composition having a plasticity number of 302 was prepared by mixing 100 parts of a gum having a viscosity greater than 1,000,000 cs. which consisted essentially of 99.5 mol percent of 3,3,3-trifluoropropylmethylsiloxane and 0.5 mol percent vinylmethylsiloxane, 142 parts of a 3,3,3-trifluoropropylmethylsiloxane fluid having a viscosity of 50,000 cs., 20 parts of a finely divided silica having a surface area of about 225 square meters per gram, 15 parts of a polytetrafluoroethylene resin having a particle size of about 0.2 micron, 70 parts of a silica extending filler having a particle size of about 5 microns and 5 parts of a hydroxylated phenylmethylsiloxane anticrepe aging agent. This composition has been successfully operated in an aircraft.

*Example 3*

A sealant composition having a plasticity number of 259 was prepared by mixing 100 parts of a gum having a viscosity greater than 1,000,000 cs. which consisted essentially of 99.5 mol percent of 3,3,3-trifluoropropylmethylsiloxane, and 0.5 mol percent vinylmethylsiloxane, 100 parts of a 3,3,3-trifluoropropylmethylsiloxane fluid having a viscosity of 50,000 cs., 20 parts of a finely divided silica having a surface area of about 225 square meters per gram, 10 parts of a polytetrafluoromethylene resin having a particle size of about 0.2 micron, 70 parts of a silica extending filler having a particle size of about 5 microns, 5 parts of a hydroxylated phenylmethylsiloxane anticrepe aging agent and 0.5 part of a carbon black pigment.

*Example 4*

A sealant composition having a plasticity number of 282 was prepared by mixing 100 parts of a gum having a viscosity greater than 1,000,000 cs. which consisted essentially of 99.5 mol percent of 3,3,3-trifluoropropylmethylsiloxane and 0.5 mol percent vinylmethylsiloxane, 144 parts of a 3,3,3-trifluoropropylmethylsiloxane fluid having a viscosity of 50,000 cs., 20 parts of a finely divided silica having a surface area of about 225 square meters per gram, 21.6 parts of a finely divided treated silica having a surface area of about 300 square meters per gram and $(CH_3)_3SiO$ units attached to the surface of the silica, 7.6 parts of a polytetrafluoroethylene resin having a particle size of about 0.2 micron, 70 parts of a silica extending filler having a particle size of about 5 microns, 5 parts of a hydroxylated phenylmethylsiloxane anticrepe aging agent and 21.6 parts of a trimethylendblocked 3,3,3 - trifluoropropylmethylsiloxane plasticizer having a viscosity of 1000 cs.

*Example 5*

A sealant composition can be obtained when 100 parts of a 3,3,3-trifluoropropylmethylsiloxane gum having a viscosity greater than 1,000,000 cs., 100 parts of a 3,3,3- trifluoropropylmethylsiloxane fluid having a viscosity of 50,000 cs., 30 parts of a finely divided silica having a surface area of about 225 square meters per gram and 5 parts of a polytetrafluoroethylene resin having a particle size of about 0.2 micron are thoroughly mixed.

*Example 6*

A sealant composition can be obtained when 100 parts of a 3,3,3-trifluoropropylmethylsiloxane gum having a viscosity greater than 1,000,000 cs., 80 parts of a 3,3,3-trifluoropropylmethylsiloxane fluid having a viscosity of about 2,500 cs., 5 parts of a finely divided silica having a surface area of at least 100 square meters per gram and 0.6 part of a polytetrafluoroethylene resin having a particle size of less than one micron are thoroughly mixed.

*Example 7*

A sealant composition can be obtained when 100 parts of a 3,3,3-trifluoropropylmethylsiloxane gum having a viscosity greater than 1,000,000 cs., 200 parts of a 3,3,3,-trifluoropropylmethylsiloxane fluid having a viscosity of 100,000 cs., 35 parts of a finely divided silica having a surface area of about 225 square meters per gram and 22 parts of a polytetrafluoroethylene resin having a particle size of about 0.2 micron are thoroughly mixed.

*Example 8*

A sealant composition can be obtained when 100 parts of a 3,3,3-trifluoropropylmethylsiloxane gum having a viscosity greater than 1,000,000 cs., 285 parts of a 3,3,3-trifluoropropylmethylsiloxane fluid having a viscosity of about 140,000 cs., 45 parts of a finely divided silica having a surface area of at least 100 square meters per gram and 25 parts of a polytetrafluoroethylene resin having a particle size of about 0.2 micron are thoroughly mixed.

*Example 9*

A sealant composition can be obtained when 100 parts of a 3,3,3-trifluoropropylmethylsiloxane gum having a viscosity of 10,000,000 cs., 170 parts of a 3,3,3-trifluoropropylmethylsiloxane fluid having a viscosity of about 30,000 cs., 10 parts of a finely divided silica having a surface area of about 300 square meters per gram and 10 parts of a polytetrafluoroethylene resin having a particle size of .9 micron are thoroughly mixed.

That which is claimed is:

1. A sealant composition having a plasticity number of 125 to 380 which consists essentially of 100 parts by weight of a 3,3,3-trifluoropropylmethylsiloxane gum, 75 to 300 parts by weight of a 3,3,3-trifluoropropylmethylsiloxane fluid having a viscosity from 2,000 to 150,000 cs., 5 to 50 parts by weight of a finely divided silica having a surface area of at least 100 square meters per gram and 0.5 to 25 parts by weight of a polytetrafluoroethylene resin having an average particle size of less than one micron.

2. A sealant composition having a plasticity number of 240 to 320 which consists essentially of 100 parts by weight of a gum, said gum consisting essentially of 99.5 mol percent of 3,3,3-trifluoropropylmethylsiloxane and 0.5 mol percent vinylmethylsiloxane, 90 to 160 parts by weight of a 3,3,3-trifluoropropylmethylsiloxane fluid having a viscosity from 30,000 to 60,000 cs., 10 to 30 parts by weight of a finely divided silica having a surface area of at least 100 square meters per gram and 5 to 20 parts by weight of a polytetrafluoroethylene resin having an average particle size of less than one micron.

3. The sealant composition of claim 2 which also contains an extending filler.

4. The sealant composition of claim 2 which also contains an anticrepe aging agent.

5. The sealant composition of claim 3 which also contains an anticrepe aging agent.

References Cited by the Examiner

UNITED STATES PATENTS

| | | | |
|---|---|---|---|
| 2,927,908 | 3/60 | Konkle et al. | 260—29.1 |
| 3,006,878 | 10/61 | Talcott | 260—29.1 |

MORRIS LIEBMAN, *Primary Examiner.*